United States Patent
Jones et al.

(10) Patent No.: US 9,550,399 B2
(45) Date of Patent: Jan. 24, 2017

(54) TOW HITCH WITH BRAKE SENSOR SYSTEM AND METHOD OF USE

(71) Applicant: Intellihitch, LLC, Amarillo, TX (US)

(72) Inventors: Dustin Jones, Elgin, TX (US); Bill Masten, Shallowater, TX (US)

(73) Assignee: Intelli-Hitch, LLC, Ralls, TX (US)

( * ) Notice: Subject to any disclaimer, the term of this patent is extended or adjusted under 35 U.S.C. 154(b) by 0 days.

(21) Appl. No.: 14/748,229

(22) Filed: Jun. 23, 2015

(65) Prior Publication Data

US 2015/0290988 A1    Oct. 15, 2015

Related U.S. Application Data

(63) Continuation-in-part of application No. 14/136,468, filed on Dec. 20, 2013, now abandoned.

(60) Provisional application No. 61/745,075, filed on Dec. 21, 2012.

(51) Int. Cl.
| | |
|---|---|
| *B60D 1/28* | (2006.01) |
| *B60D 1/24* | (2006.01) |
| *B60D 1/62* | (2006.01) |
| *B60T 7/20* | (2006.01) |
| *F16D 66/00* | (2006.01) |

(52) U.S. Cl.
CPC ............ *B60D 1/242* (2013.01); *B60D 1/245* (2013.01); *B60D 1/62* (2013.01); *B60T 7/20* (2013.01); *B60W 2300/14* (2013.01); *B60W 2530/22* (2013.01); *F16D 2066/005* (2013.01)

(58) Field of Classification Search
CPC ................................ B60D 1/366; B60D 1/32
USPC ................ 280/446.1; 180/112 R, 112 A, 3 R
See application file for complete search history.

(56) References Cited

U.S. PATENT DOCUMENTS

| | | | | |
|---|---|---|---|---|
| 4,023,864 A | * | 5/1977 | Lang ................ | B60G 17/01925 188/112 A |
| 4,196,936 A | * | 4/1980 | Snyder .................... | B60T 8/248 188/112 A |
| 5,108,123 A | * | 4/1992 | Rubenzik ................ | B60D 1/36 280/477 |
| 5,132,664 A | * | 7/1992 | Feldmann ................ | B60T 7/20 188/1.11 R |
| 6,189,910 B1 | * | 2/2001 | Bartel .................... | B60D 1/06 280/491.1 |
| 6,280,004 B1 | * | 8/2001 | Greaves, Jr. ............ | B60T 7/20 188/3 R |

(Continued)

*Primary Examiner* — Anne Marie Boehler
*Assistant Examiner* — Marlon A Arce
(74) *Attorney, Agent, or Firm* — Whitaker Chalk Swindle & Schwartz PLLC

(57) ABSTRACT

A tow hitch that detects movement between a towing vehicle and a load and adjusts the braking forces of the load brakes proportionately to the movement, is disclosed. Said tow hitch comprising a load tow member selectively engaged with a vehicle tow member, a one or more sensors connected to the load tow member, and at least one of the one or more sensors is disposed between the vehicle tow member and the load tow member when the load tow member is engaged with the vehicle tow member. The at least one of the one or more sensors is in electronic communication with the load brakes, whereby the at least one of the one or more sensors senses movement between a load member and a vehicle member when the load tow member is engaged with the vehicle tow member and adjusts the braking forces of the load brakes.

21 Claims, 14 Drawing Sheets

(56) References Cited

U.S. PATENT DOCUMENTS

| | | | | |
|---|---|---|---|---|
| 6,382,018 B2 * | 5/2002 | Knestel | ............... | G01M 17/04 340/467 |
| 6,663,133 B1 * | 12/2003 | Rosenlund | ............... | B60D 1/06 280/490.1 |
| 6,705,684 B1 * | 3/2004 | Garvey | ............... | B60T 7/20 188/112 A |
| 7,438,368 B2 * | 10/2008 | Kohler | ............... | B60D 1/065 188/1.11 E |
| 7,905,555 B2 * | 3/2011 | Huntimer | ............... | B60D 1/30 188/112 A |
| 8,038,166 B1 * | 10/2011 | Piesinger | ............... | B60D 1/06 280/477 |
| 8,380,390 B2 * | 2/2013 | Sy | ............... | B60T 8/1708 280/400 |

* cited by examiner

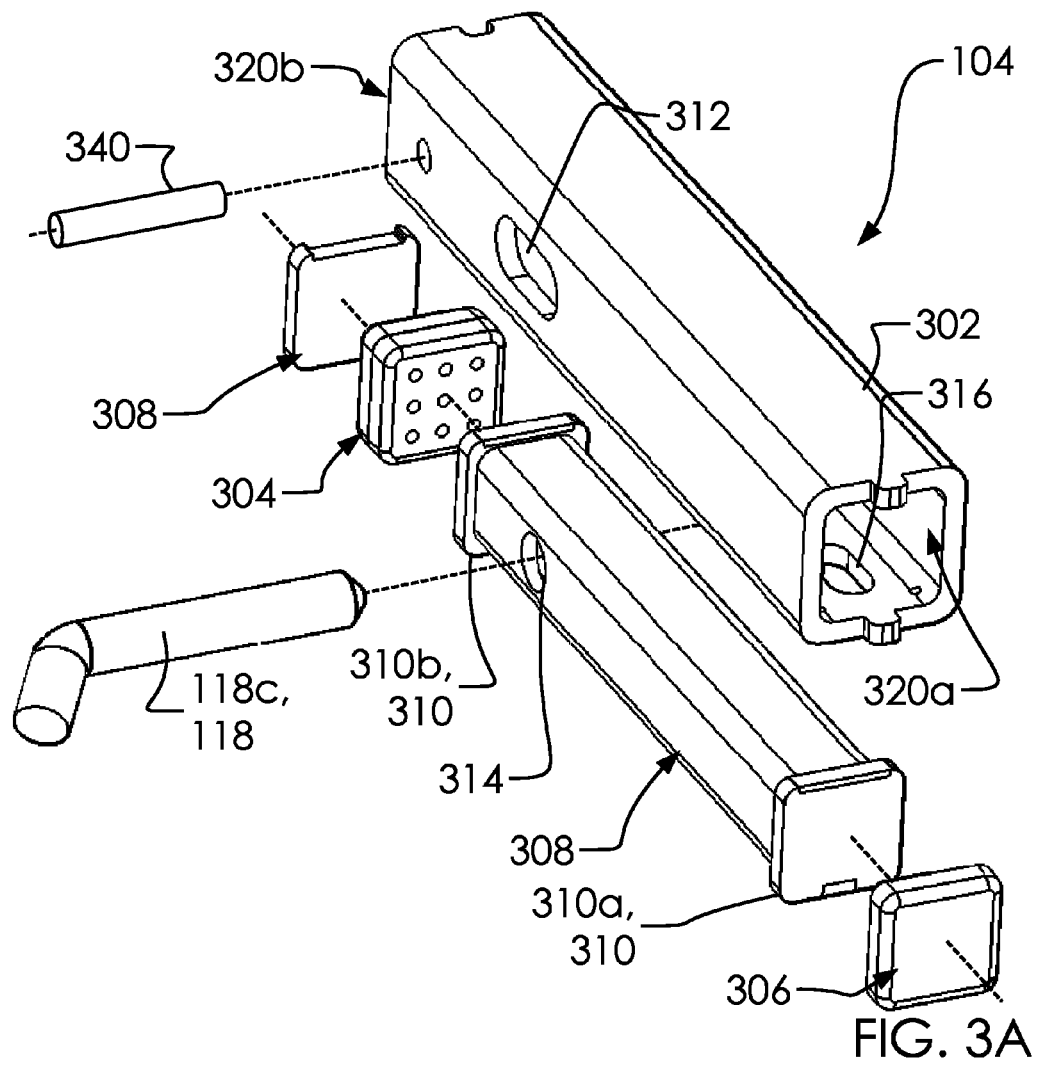
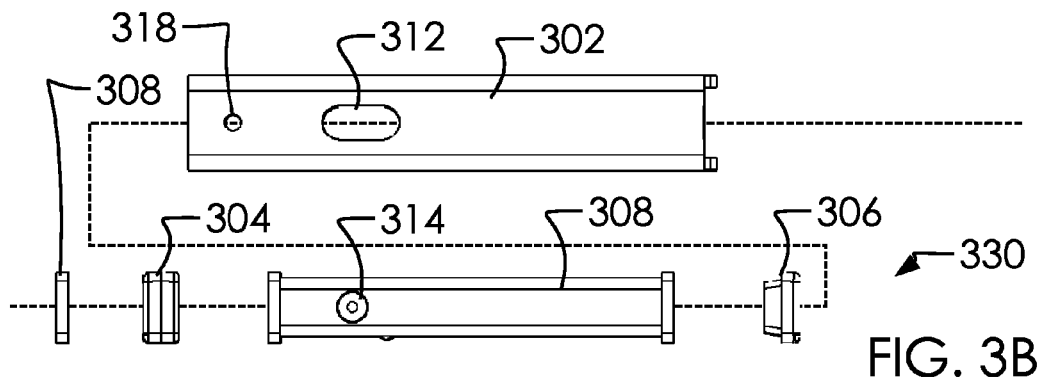
FIG. 3A
FIG. 3B

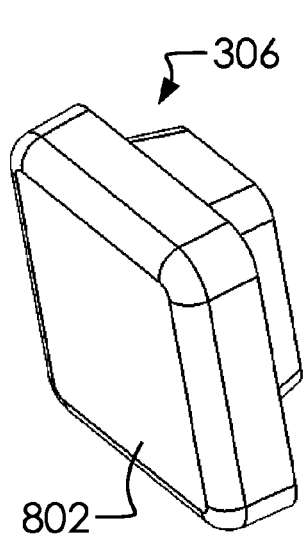
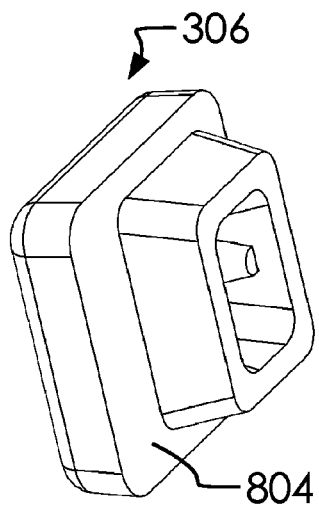
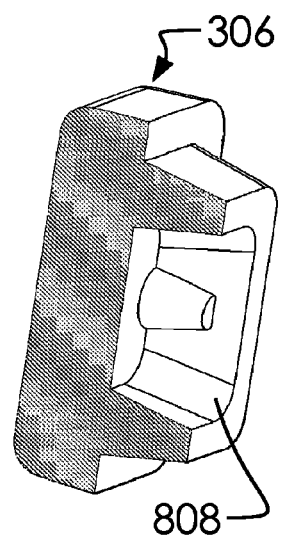
FIG. 9A  FIG. 9B  FIG. 9C
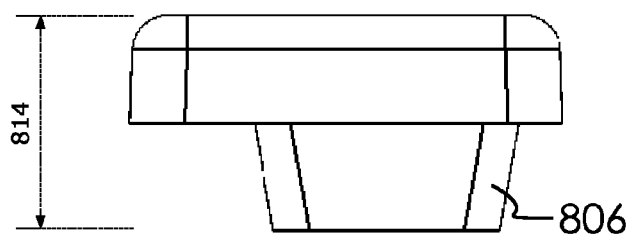
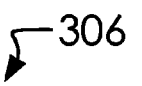
FIG. 9D
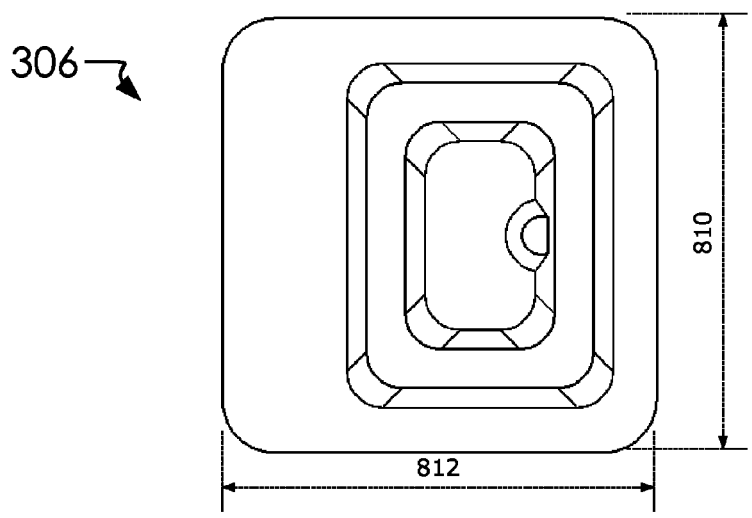
FIG. 9E

TOW HITCH WITH BRAKE SENSOR SYSTEM AND METHOD OF USE

CROSS-REFERENCE TO RELATED APPLICATIONS

This application claims benefit of U.S. Nonprovisional patent application Ser. No. 14/136,468 (filed on Dec. 20, 2013), which is co-pending at the time of filing of this application. This application also claims benefit of U.S. Provisional Patent Application No. 61/745,075 (filed on Dec. 21, 2012). Accordingly, portions of this application may qualify under pre-AIA rules. Those portions will be identified as prosecution of the current application proceeds and as necessary for allowance of this application. Both of these applications are owned by the current Applicant and bear the same inventors. Note that all of the inventors on this and the parent applications are owners in the current applicant-company. Since ownership is maintained between the parent applications and this application, continuity is thereby maintained.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to a Tow Hitch with Brake Sensor System and Method of Use. Examples of similar disclosures can be found at U.S. Pat. No. 4,023,864 A (Lang et al.), U.S. Pat. No. 4,196,936 A (Snyder, Robert C.), U.S. Pat. No. 5,108,123 A (Rubenzik, Robert), U.S. Pat. No. 5,132,664 A (Feldmann et al.), U.S. Pat. No. 6,382,018 B2 (Knestel, Anton), U.S. Pat. No. 6,663,133 B1 (Rosenlund, Blaine L.), U.S. Pat. No. 6,705,684 B1 (Garvey, Vincent), U.S. Pat. No. 7,438,368 B2 (Roy Kohler et al.), U.S. Pat. No. 7,905,555 B2 (Huntimer, Todd M.), U.S. Pat. No. 8,038,166 B1 (Piesinger, Gregory Hubert), and U.S. Pat. No. 8,380,390 B2 (Sy et al.). However, none of the known inventions and patents, taken either singularly or in combination, is seen to describe the instant disclosure as claimed. Accordingly, an improved Tow Hitch with Brake Sensor System and Method of Use would be advantageous.

The parent application to this submission (U.S. patent application Ser. No. 14/136,468) is currently (as of 2015 Jun. 23) under a non-final rejection for the following rationale: under 35 U.S.C. 102(a)(1) as being anticipated by Kohler (U.S. Pat. No. 7,438,368); under 35 U.S.C. 103 as being unpatentable over Kohler in view of Feldmann (U.S. Pat. No. 5,132,664); under 35 U.S.C. 103 as being unpatentable over Kohler in view of Piesinger (U.S. Pat. No. 8,038,166); under 35 U.S.C. 103 as being unpatentable over Kohler in view of Sy (U.S. Pat. No. 8,380,390); and under 35 U.S.C. 103 as being unpatentable over Kohler in view of Rubenzik (U.S. Pat. No. 5,108,123). The claims submitted below have considered the objections of the office action.

BRIEF SUMMARY OF THE INVENTION

A tow hitch that detects movement between a towing vehicle and a load and adjusts the braking forces of the load brakes proportionately to the movement, is disclosed. Said tow hitch comprising a load tow member selectively engaged with a vehicle tow member, a one or more sensors connected to the load tow member, and at least one of the one or more sensors is disposed between the vehicle tow member and the load tow member when the load tow member is engaged with the vehicle tow member. The at least one of the one or more sensors is in electronic communication with the load brakes, whereby the at least one of the one or more sensors senses movement between a load member and a vehicle member when the load tow member is engaged with the vehicle tow member and adjusts the braking forces of the load brakes.

BRIEF DESCRIPTION OF THE SEVERAL VIEWS OF THE DRAWING

FIG. 3A illustrates an exploded perspective overview of a draw tube assembly 104.

FIG. 3B illustrates an exploded elevated front view of a draw tube assembly 104.

FIG. 5A illustrates an elevated top view of an inner portions 330 in a first position 500a.

FIG. 6A illustrates an elevated bottom side view of an inner portions 330 in a first position 500a.

FIG. 9A illustrates a perspective first side overview of a second elastic energy storage device 306. FIG. 9B illustrates a perspective second side overview of a second elastic energy storage device 306. FIG. 9C illustrates a perspective cross-section overview of a second elastic energy storage device 306. FIG. 9D illustrates an elevated top view of a second elastic energy storage device 306. FIG. 9E illustrates an elevated side view of a second elastic energy storage device 306.

FIG. 13A illustrates a perspective overview of an inner portions 330 in a first position 500a.

DETAILED DESCRIPTION OF THE INVENTION

Described herein is a tow hitch with brake sensor system and method of use. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system-and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
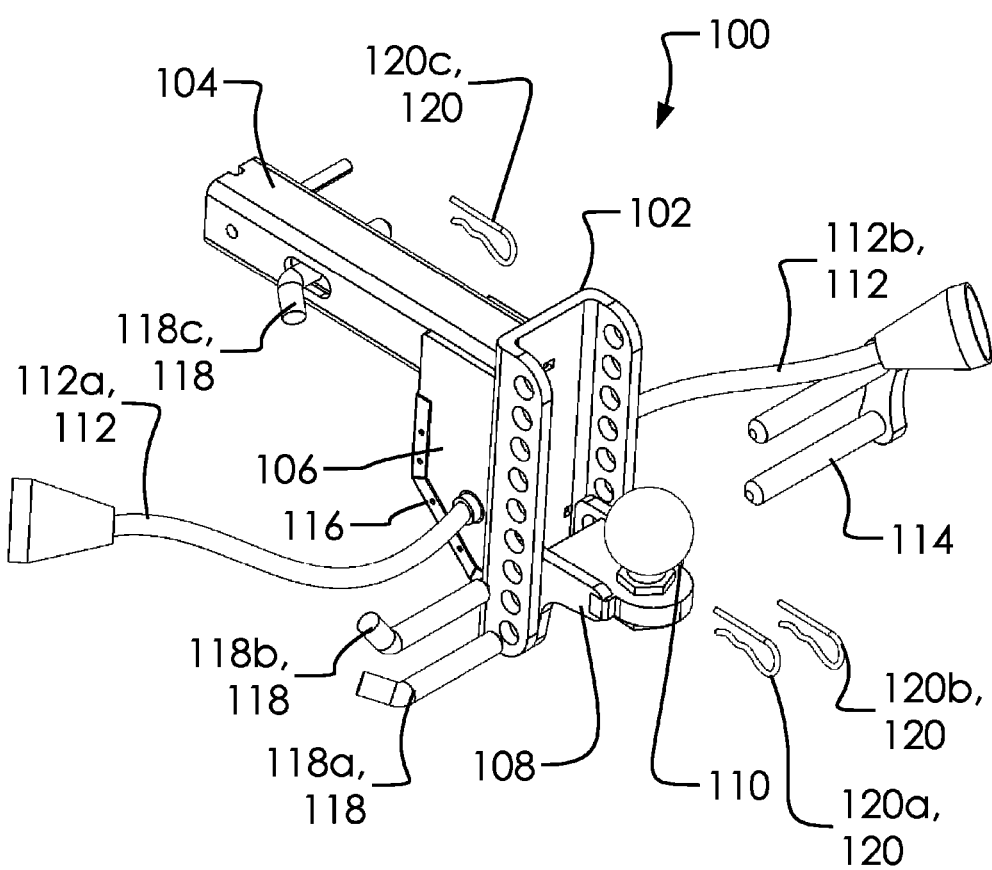
FIG. 1 illustrates a perspective overview of a hitch system 100.

FIG. 1 illustrates a perspective overview of a hitch system 100.

Illustrated herein are a hitch system 100, an elevator channel 102, a draw tube assembly 104, a circuit compartment 106, a ball foot assembly 108, a hitch ball 110, an one or more harness plugs 112, a first harness plug 112a, a second harness plug 112b, a latch 114, a cover 116, an one or more keyed pins 118, a first keyed pin 118a, a second keyed pin 118b, a third keyed pin 118c, an one or more spring clips 120, a first spring clip 120a, a second spring clip 120b, and a third spring clip 120c.

In one embodiment, said hitch system 100 can comprise said elevator channel 102, said draw tube assembly 104, said circuit compartment 106, said ball foot assembly 108, said one or more harness plugs 112, said latch 114, and said one or more spring clips 120.

In one embodiment, said latch 114 can comprise a mono latch.

Figure 2:
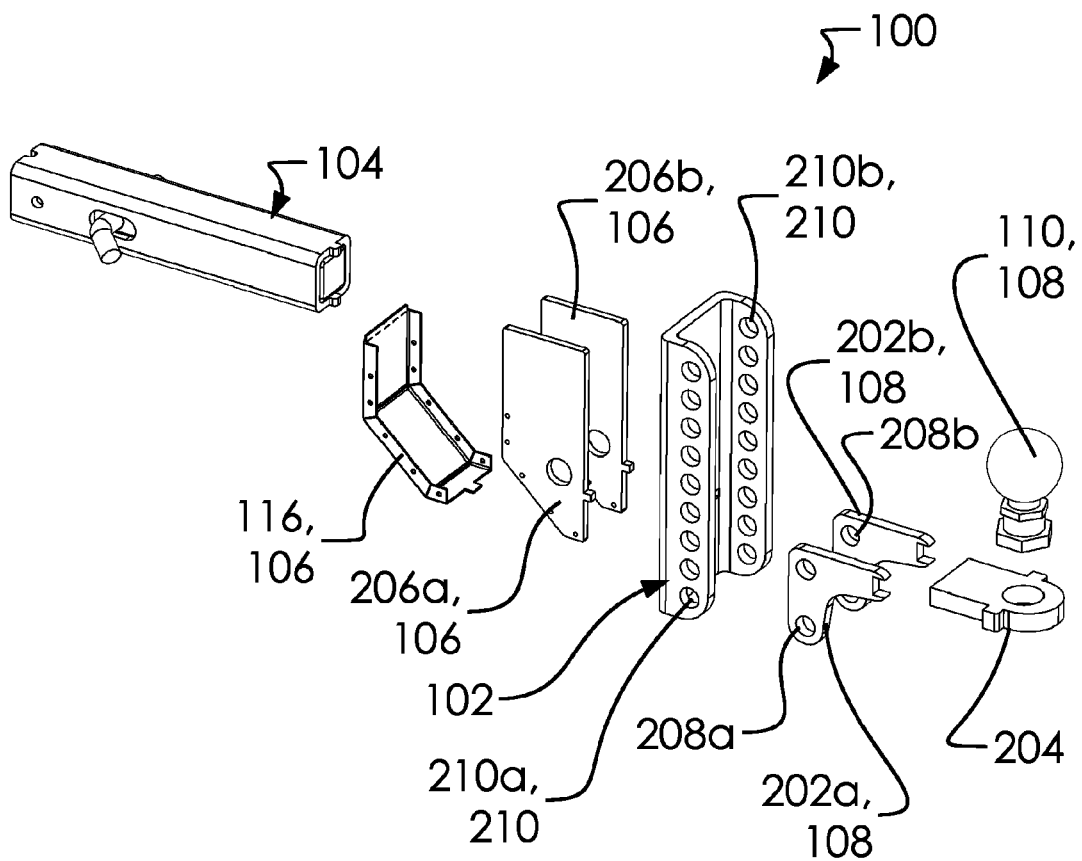
FIG. 2 illustrates an exploded perspective overview of a hitch system 100.

FIG. 2 illustrates an exploded perspective overview of a hitch system 100.

Illustrated herein are a side plates 202, a first side plate 202a, a second side plate 202b, a bore ball mount plate 204, a first side wall 206a, a second side wall 206b, an one or more alignment apertures 208, a first side alignment apertures 208a, a second side alignment apertures 208b, an elevator apertures 210, a first side elevator apertures 210a, and a second side elevator apertures 210b.

In one embodiment, said side plates 202 can comprise said first side plate 202a, said second side plate 202b, and said one or more alignment apertures 208. In one embodiment, said one or more alignment apertures 208 can comprise said first side alignment apertures 208a, said second side alignment apertures 208b. In one embodiment, said elevator apertures 210 can comprise said first side elevator apertures 210a, said second side elevator apertures 210b.

In one embodiment, attaching said ball foot assembly 108 to said elevator channel 102 can comprise aligning and attaching said one or more alignment apertures 208 with a portion of said elevator apertures 210. In one embodiment, said one or more alignment apertures 208 can be attached to said elevator apertures 210 with said one or more keyed pins 118 and/or said latch 114, as is known in the art.

FIG. 3A illustrates an exploded perspective overview of a draw tube assembly 104. FIG. 3B illustrates an exploded elevated front view of a draw tube assembly 104.

Illustrated herein are an outer draw tube 302, a first elastic energy storage device 304, a second elastic energy storage device 306, an inner draw tube 308, an end caps 310, a first end cap 310a, a second end cap 310b, an outer aperture 312, an inner aperture 314, a sensor notch 316, a roll pin aperture 318, a first open end 320a, a second open end 320b, an inner portions 330, and a roll pin 340.

In one embodiment, said outer draw tube 302 can comprise said outer aperture 312, said sensor notch 316, said roll pin aperture 318, said first open end 320a, said second open end 320b, said inner diameter 402, said length 404, and said outer diameter 406.

In one embodiment, said first elastic energy storage device 304 can comprise said one or more apertures 702, said front face 704, said back face 706, said width 708, said height 710, said depth 712, said y axis 714. In one embodiment, said second elastic energy storage device 306 can comprise said first side 902, said second side 904, said extension 906, said cup 908, said height 910, said width 912, and said depth 914. In one embodiment, said inner draw tube 308 can comprise said end caps 310, said inner aperture 314, said outer diameter 403, said magnet 604, said magnet 1102. In one embodiment, said end caps 310 can comprise said first end cap 310a, said second end cap 310b. In one embodiment, said inner aperture 314 can comprise said width 416.

In one embodiment, said outer draw tube 302 and said inner draw tube 308 can comprise square tubing. In one embodiment, said end caps 310 can enclose said inner draw tube 308. In one embodiment, said inner draw tube 308 can be affixed to a portion of said second open end 320b of said outer draw tube 302 so as to close off said second open end 320b. In one embodiment, said third keyed pin 118c can slide through said outer aperture 312 and said inner aperture 314 as described below. In one embodiment, said first elastic energy storage device 304 and said second elastic energy storage device 306 can compress and decompress when force is applied and removed therefrom. In one embodiment, said inner portions 330 can comprise said first elastic energy storage device 304, said second elastic energy storage device 306, and said inner draw tube 308. In one embodiment, said roll pin 340 can selectively slide into said roll pin aperture 318 in order to hold a portion of said inner portions 330 within said outer draw tube 302.

In one embodiment, the term "elastic energy storage device" can mean that said first elastic energy storage device 304 and said second elastic energy storage device 306 are elements being mechanical or semi mechanical capable storing elastic energy or inducing an elastic like response; e.g. elastomer, rubber, natural cellulous. Situated around a steel spring. Logically or analog driven. Capable of exerting energy on another device.

Figure 4A:
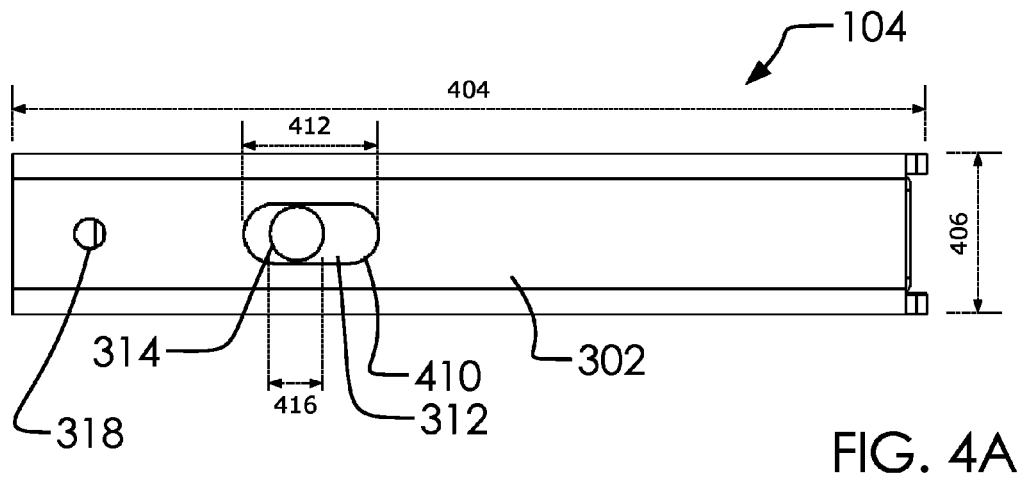
FIG. 4A illustrates an elevated front view of a draw tube assembly 104.
Figure 4B:
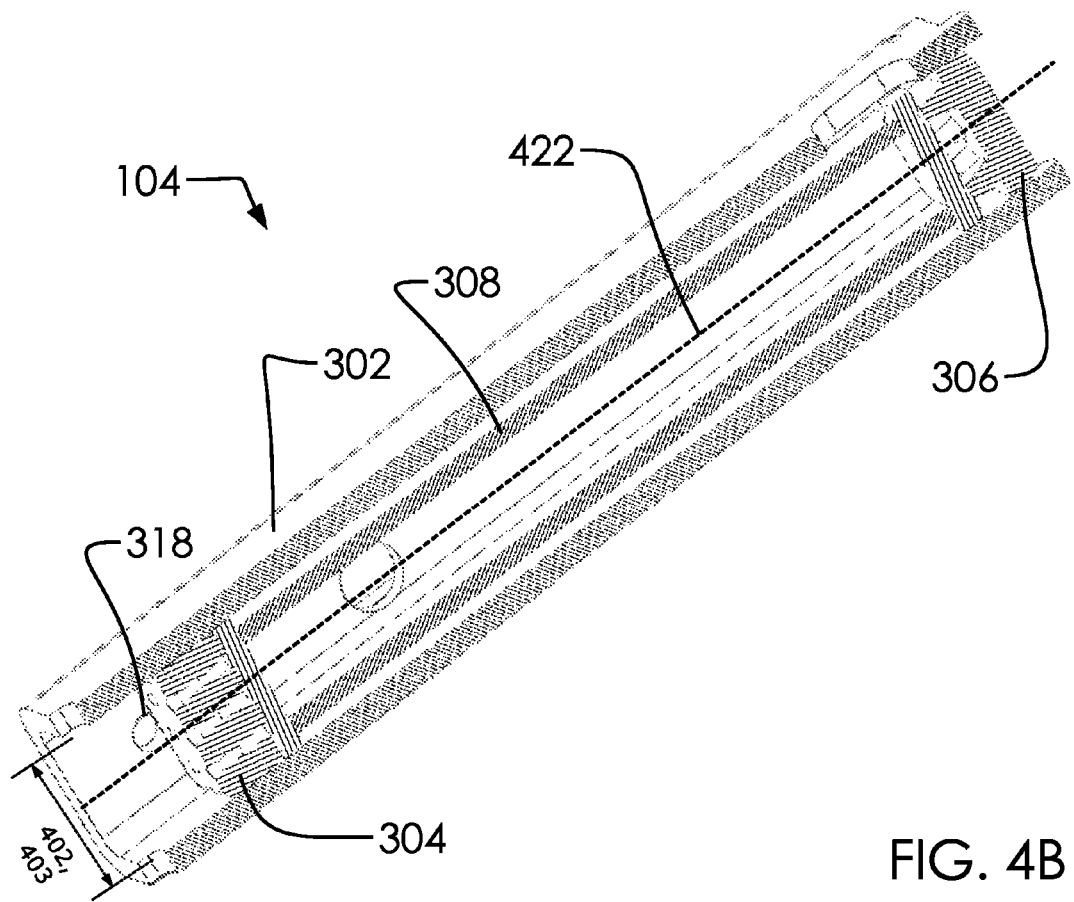
FIG. 4B illustrates a cross-section perspective overview of a draw tube assembly 104.

FIG. 4A illustrates an elevated front view of a draw tube assembly 104. FIG. 4B illustrates a cross-section perspective overview of a draw tube assembly 104.

Illustrated herein are an inner diameter 402, an outer diameter 403, a length 404, an outer diameter 406, an outer aperture 410, a width 412, a width 416, and an x axis 422.

In one embodiment, said outer aperture 410 can comprise said width 412.

In one embodiment, said outer draw tube 302 and said inner draw tube 308 can comprise a square tubing, or similar, each comprising a width and height being substantially similar.

In one embodiment, said inner diameter 402 and said outer diameter 403 can be substantially similar, however, said outer diameter 403 is smaller than said inner diameter 402 in so far as said inner draw tube 308 is able to move according to specification within said outer draw tube 302.

In one embodiment, said inner draw tube 308 can move along said x axis 422 within said outer draw tube 302.

Figure 5A:
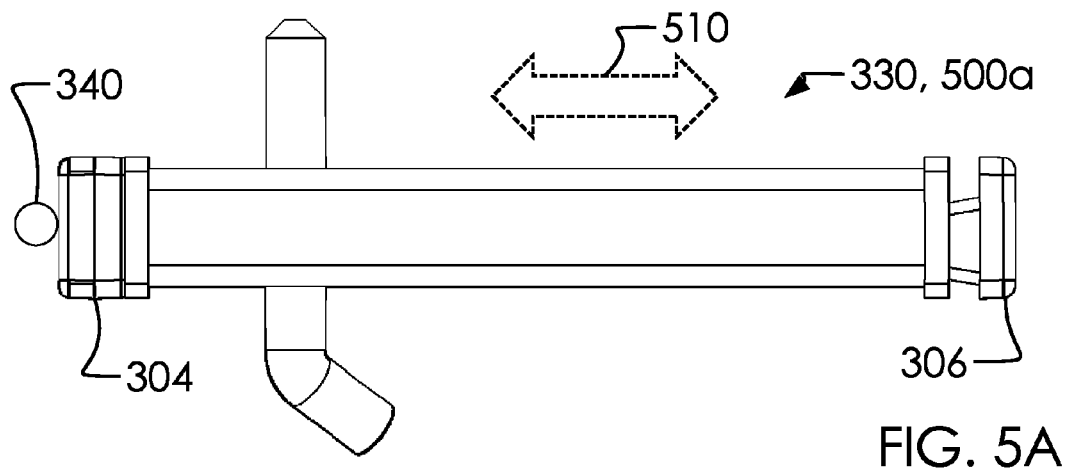
Figure 5B:
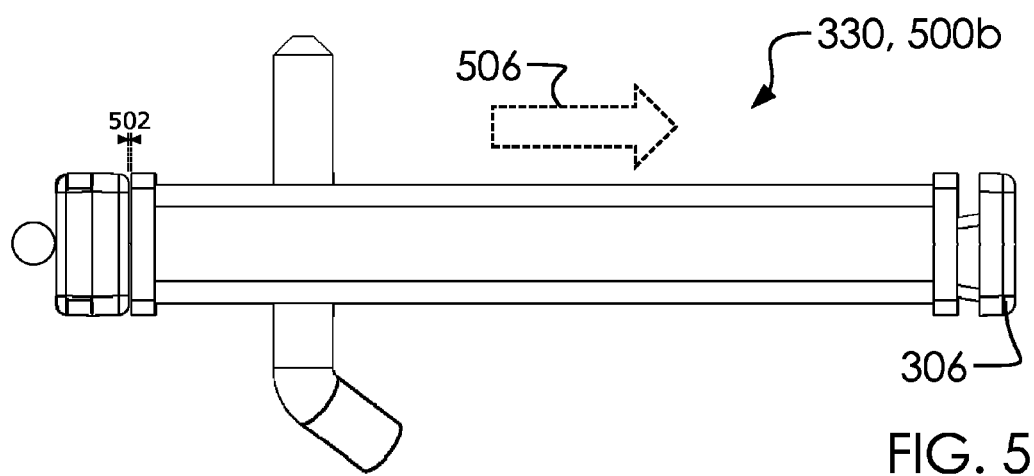
FIG. 5B illustrates an elevated top view of an inner portions 330 in a second position 500b.
Figure 5C:
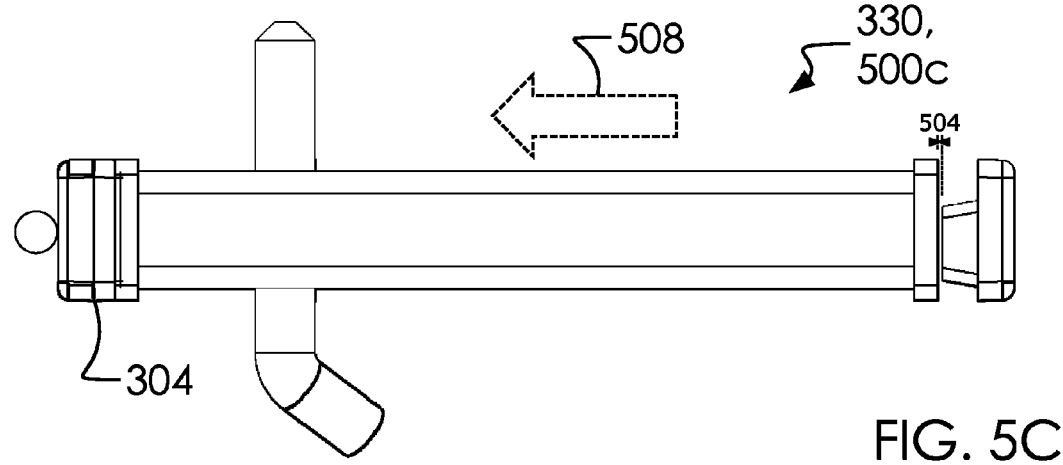
FIG. 5C illustrates an elevated top view of an inner portions 330 in a third position 500c.

FIG. 5A illustrates an elevated top view of an inner portions 330 in a first position 500a. FIG. 5B illustrates an elevated top view of an inner portions 330 in a second position 500b. FIG. 5C illustrates an elevated top view of an inner portions 330 in a third position 500c.

Illustrated herein are a first position 500a, a second position 500b, a third position 500c, a forward movement distance 502, a rearward movement distance 504, a forward force 506, a rearward force 508, and a relative equilibrium 510.

In one embodiment, said first position 500a can comprise said inner portions 330 in a relative equilibrium 510; said second position 500b can comprise said hitch system 100 under forward force 506 (such as deceleration); and said third position 500c can comprise said hitch system 100 and said inner portions 330 under a rearward force 508 (such as an acceleration). In one embodiment, said inner portions 330 can compress said second elastic energy storage device 306 under said forward force 506 and can compress said first elastic energy storage device 304 under said rearward force 508.

Figure 6A:
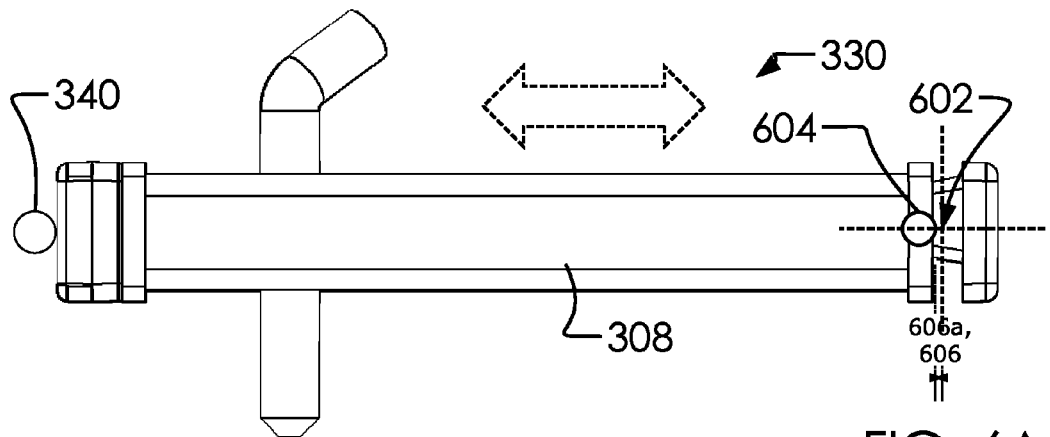
Figure 6B:
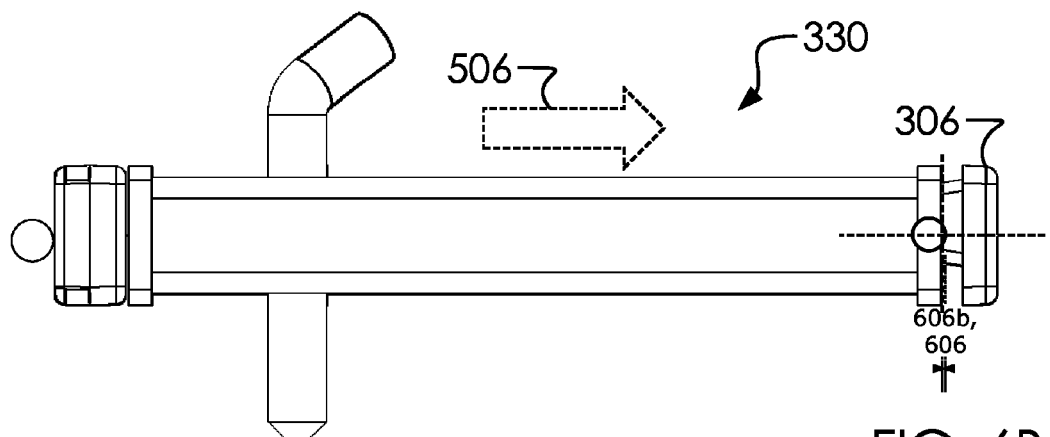
FIG. 6B illustrates an elevated bottom side view of an inner portions 330 in a second position 500b.
Figure 6C:
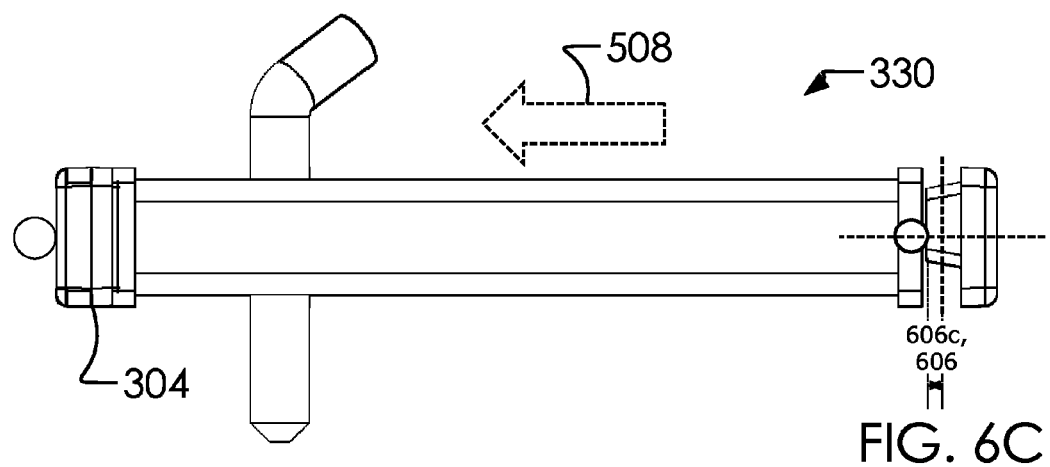
FIG. 6C illustrates an elevated bottom side view of an inner portions 330 in a third position 500c.

FIG. 6A illustrates an elevated bottom side view of an inner portions 330 in a first position 500a. FIG. 6B illustrates an elevated bottom side view of an inner portions 330 in a second position 500b. FIG. 6C illustrates an elevated bottom side view of an inner portions 330 in a third position 500c.

Illustrated herein are a sensor location 602, a magnet 604, a proximity 606, a first proximity 606a, and a second proximity 606b, and a third proximity 606c.

In one embodiment, said proximity 606 can comprise said first proximity 606a, said second proximity 606b, and said third proximity 606c.

In one embodiment, a sensor and circuit assembly 1100 (not illustrated here, see infra) can be used to sense said proximity 606 said magnet 604 as related to said sensor location 602.

Figure 7A:
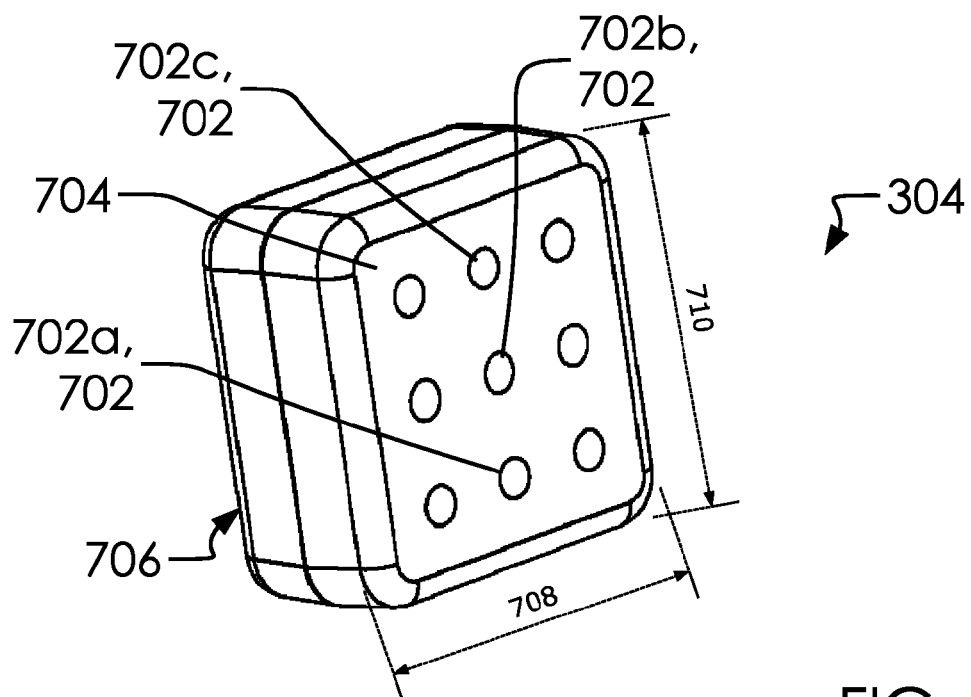
FIG. 7A illustrates a perspective overview of a first elastic energy storage device 304.
Figure 7B:
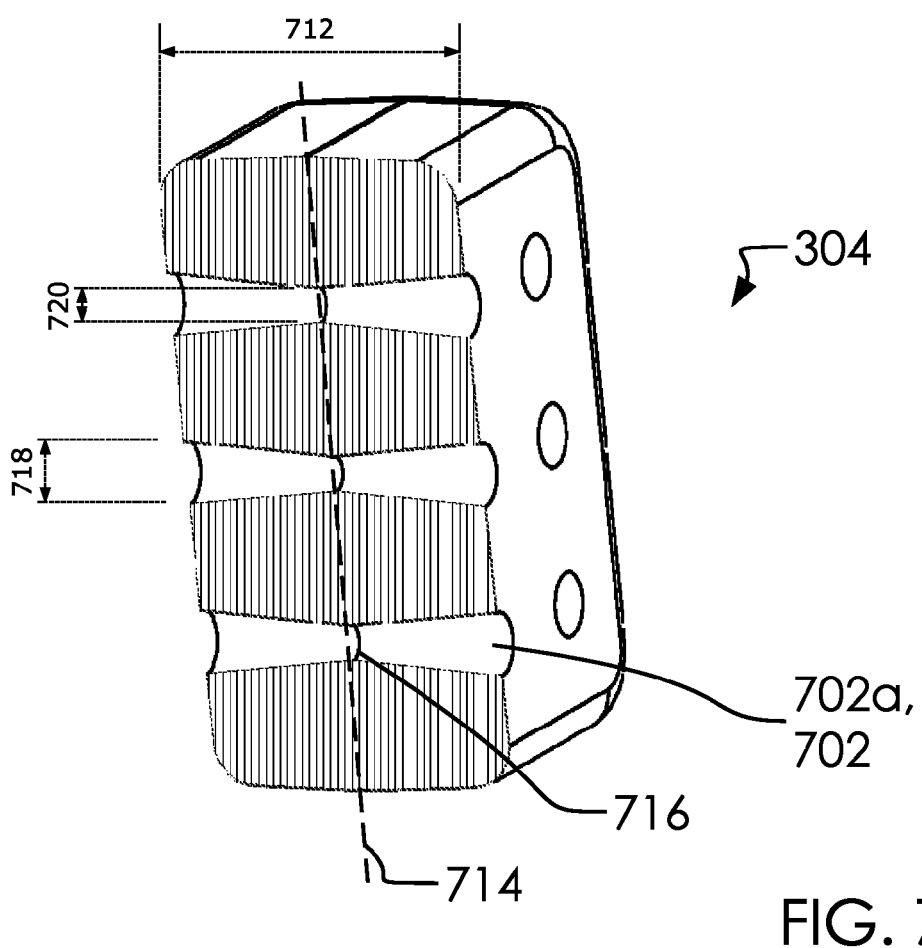
FIG. 7B illustrates a cross-section perspective overview of a first elastic energy storage device 304.

FIG. 7A illustrates a perspective overview of a first elastic energy storage device 304. FIG. 7B illustrates a cross-section perspective overview of a first elastic energy storage device 304.

Illustrated herein are an one or more apertures 702, a first aperture 702a, a second aperture 702b, a third aperture 702c, a front face 704, a back face 706, a width 708, a height 710, a depth 712, a y axis 714, a first diameter 718, and a second diameter 720.

In one embodiment, said one or more apertures 702 can comprise said first aperture 702a, said second aperture 702b, said third aperture 702c, said first diameter 718, said second diameter 720.

In one embodiment, said first elastic energy storage device 304 can comprise ethane or an ether based urethane.

In one embodiment, the diameter of said one or more apertures 702 can taper downward while approaching said y axis 714 (at a central point in said one or more apertures 702), as illustrated. For example, in one embodiment, said one or more apertures 702 can comprise said first diameter 718 at said front face 704 and said back face 706, and said second diameter 720 at said y axis 714. In one embodiment, said first elastic energy storage device 304 (and said second elastic energy storage device 306) can compress and decompress to substantially identical dimensions (that is a "nominal shape") making it an ideal buffer to reset said inner portions 330 relative to said magnet 604.

Figure 8A:
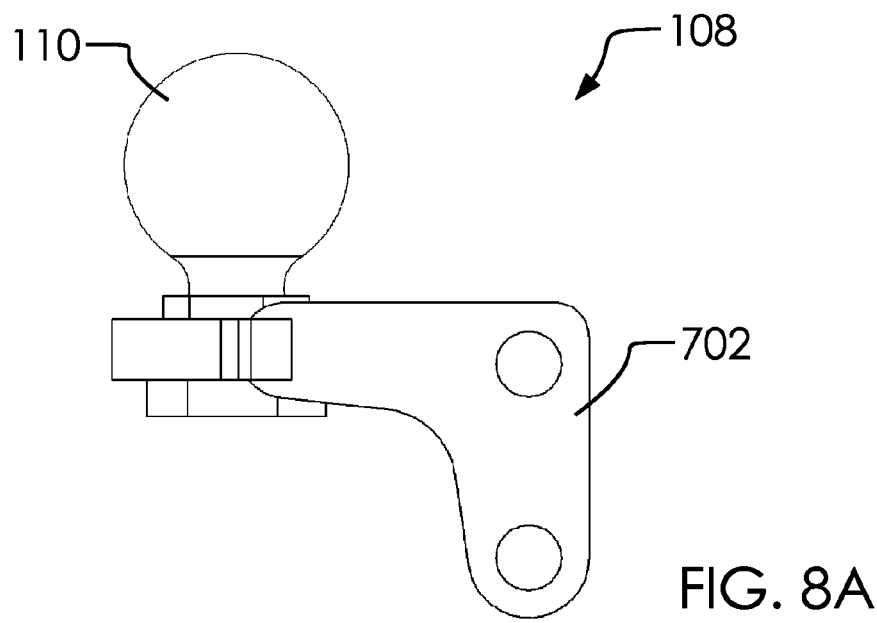
FIG. 8A illustrates an elevated front view of a ball foot assembly 108.
Figure 8B:
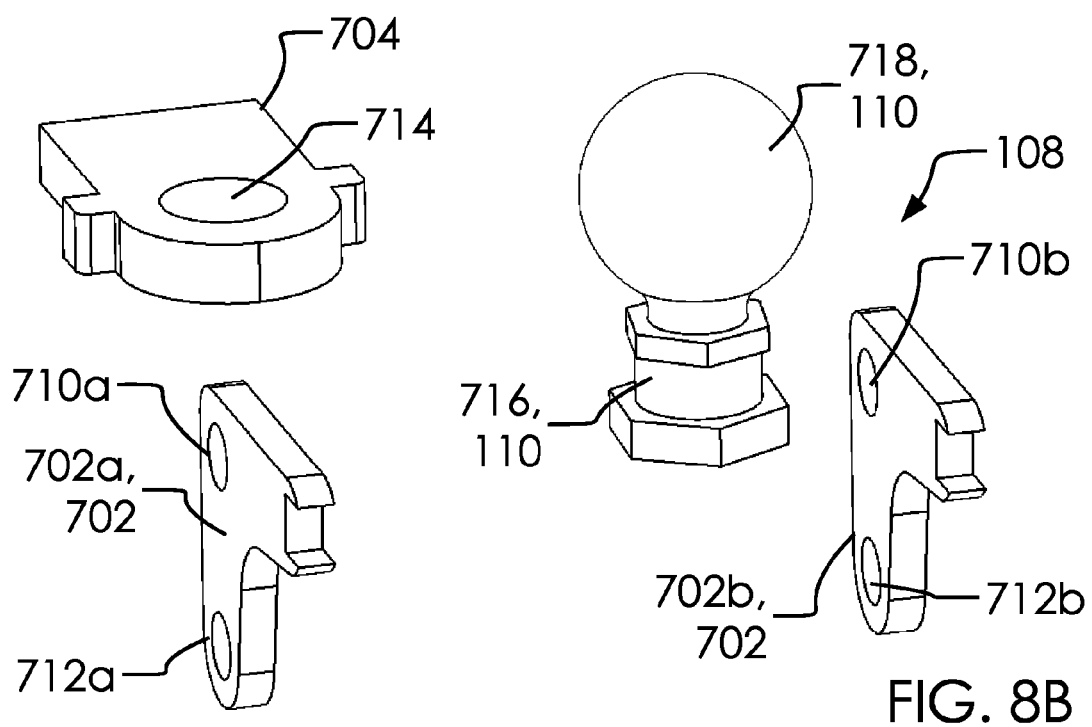
FIG. 8B illustrates a perspective exploded overview of a ball foot assembly 108.

FIG. 8A illustrates an elevated front view of a ball foot assembly 108. FIG. 8B illustrates a perspective exploded overview of a ball foot assembly 108.

Illustrated herein are a side plates 802, a first side plate 802a, a second side plate 802b, a bore ball mount plate 804, a first upper aperture 810a, a second upper aperture 810b, a first lower aperture 812a, a second lower aperture 812b, a bore aperture 814, a lower socket portion 816, and an upper ball portion 818.

In one embodiment, said side plates 802 can comprise said first side plate 802a, said second side plate 802b. In one embodiment, said first side plate 802a can comprise said first upper aperture 81a, said first lower aperture 812a. In one embodiment, said second side plate 802b can comprise said second upper aperture 810b, said second lower aperture 812b. In one embodiment, said bore ball mount plate 804 can comprise said bore aperture 814.

FIG. 9A illustrates a perspective first side overview of a second elastic energy storage device 306. FIG. 9B illustrates a perspective second side overview of a second elastic energy storage device 306. FIG. 9C illustrates a perspective cross-section overview of a second elastic energy storage device 306. FIG. 9D illustrates an elevated top view of a second elastic energy storage device 306. FIG. 9E illustrates an elevated side view of a second elastic energy storage device 306.

Illustrated herein are a first side 902, a second side 904, an extension 906, a cup 908, a height 910, a width 912, and a depth 914.

In one embodiment, said extension 906 can interface with said first end cap 310a of said inner draw tube 308.

Figure 10A:
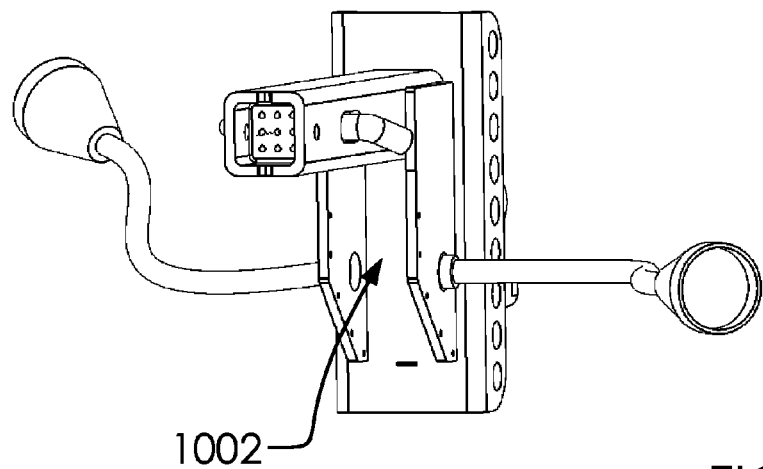
FIG. 10A illustrates a perspective overview of a hitch system 100 with said circuit compartment 106 disassembled.
Figure 10B:
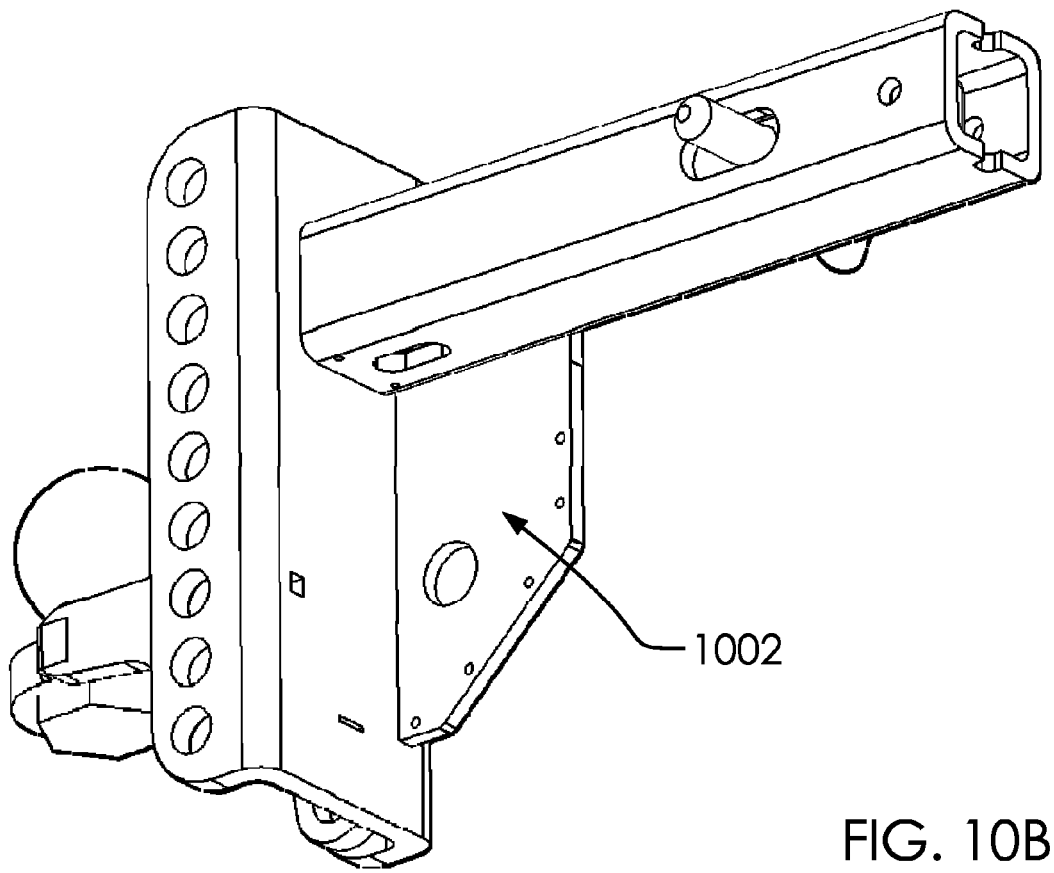
FIG. 10B illustrates a perspective lower side view of a hitch system 100 with said circuit compartment 106 disassembled.

FIG. 10A illustrates a perspective overview of a hitch system 100 with said circuit compartment 106 disassembled. FIG. 10B illustrates a perspective lower side view of a hitch system 100 with said circuit compartment 106 disassembled.

Illustrated herein are a circuit cavity 1002.

Figure 11:
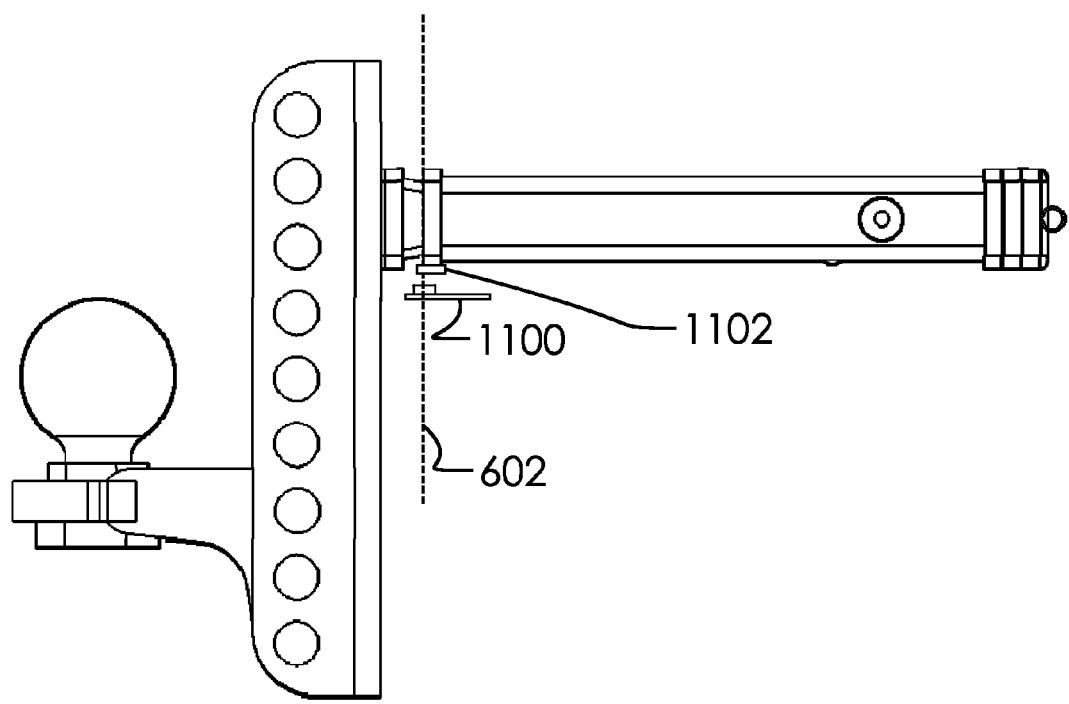
FIG. 11 illustrates an elevated front view of a hitch system 100 without said outer draw tube 302.

FIG. 11 illustrates an elevated front view of a hitch system 100 without said outer draw tube 302.

Illustrated herein are a sensor and circuit assembly 1100, and a magnet 1102.

In one embodiment, said sensor and circuit assembly 1100 can comprise said case 1202, said integrated circuit 1204.

In one embodiment, said magnet 1102 can comprise NdFeBr. In one embodiment, said 1hitch system 100 selectively senses said proximity 606 between said sensor location 602 and said magnet 1102.

Figure 12:
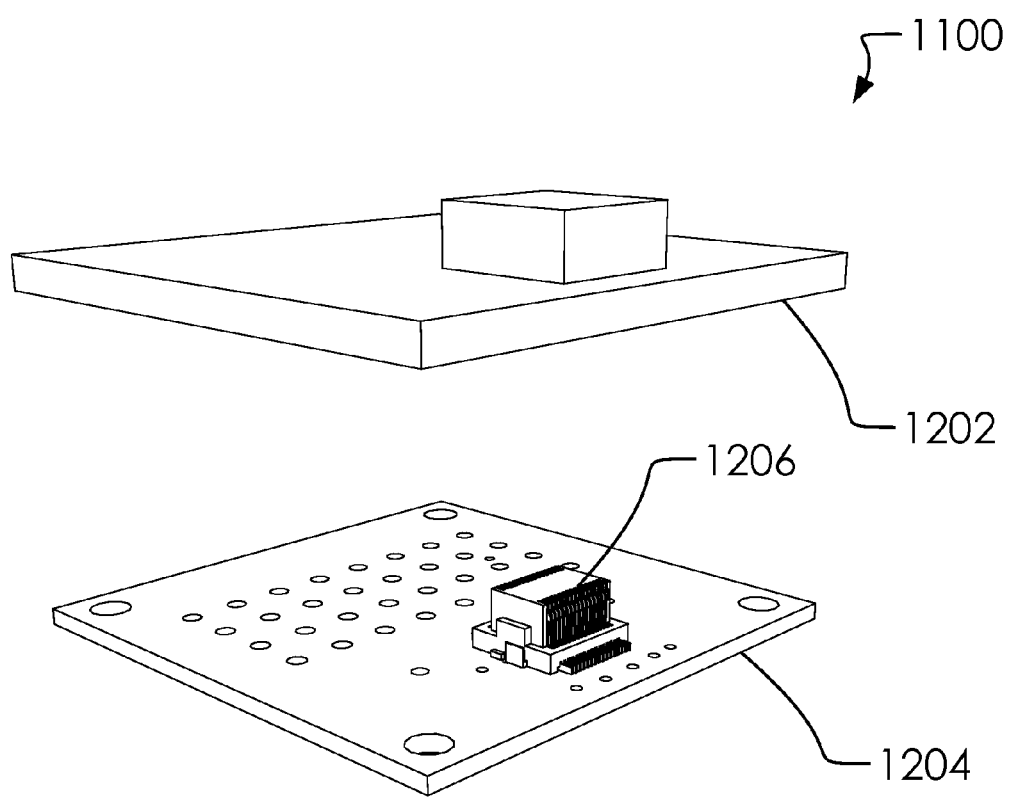
FIG. 12 illustrates a perspective exploded overview of a sensor assembly 1100.

FIG. 12 illustrates a perspective exploded overview of a sensor assembly 1100.

Illustrated herein are a case 1202, an integrated circuit 1204, and a sensor 1206.

In one embodiment, said integrated circuit 1204 can comprise said sensor 1206. In one embodiment, said sensor 1206 can comprise said sensor location 602.

In one embodiment, said integrated circuit 1204 can be protected by said case 1202. These illustrations of said 1hitch system 100 are for illustration only and may comprise different dimensions and features, as is known in the art.

Figure 13A:
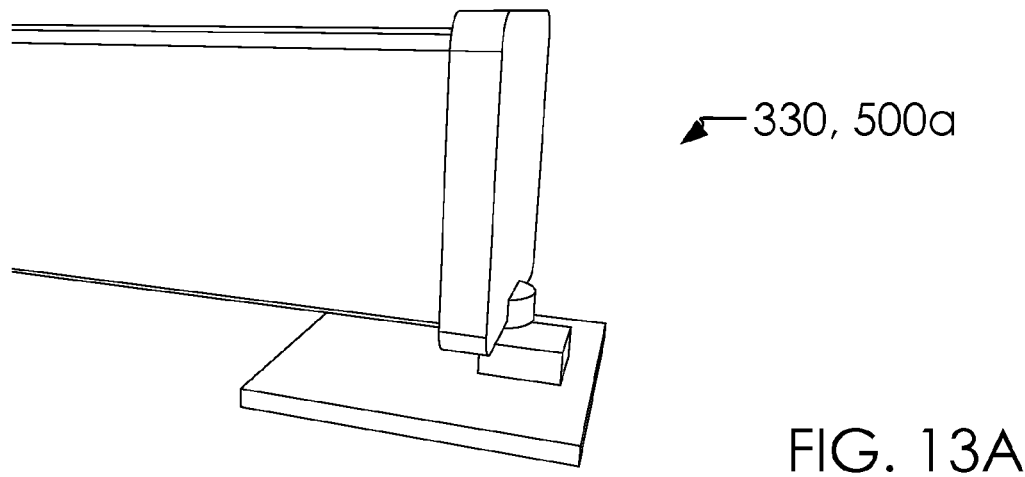
Figure 13B:
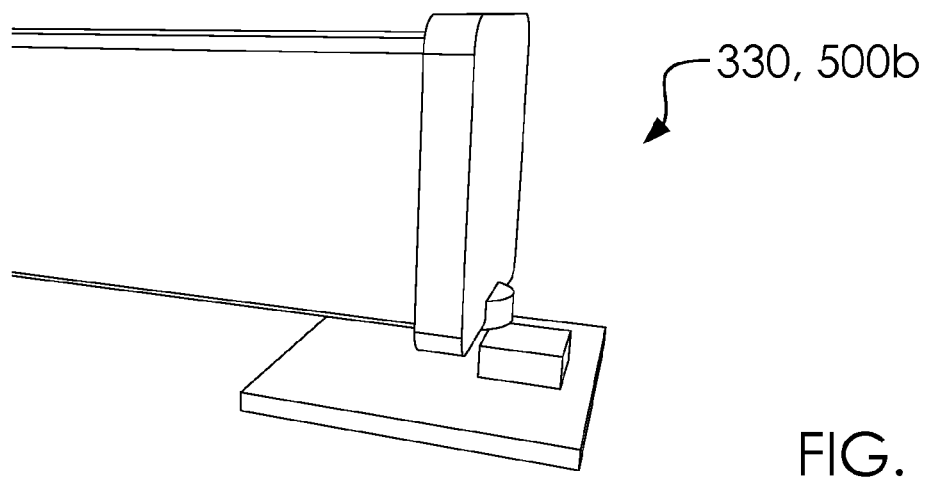
FIG. 13B illustrates a perspective overview of an inner portions 330 in a second position 500b.
Figure 13C:
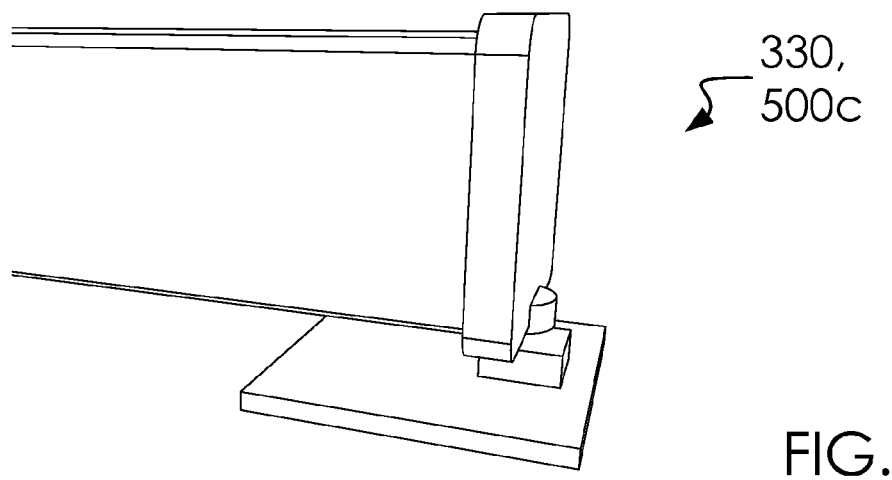
FIG. 13C illustrates a perspective overview of an inner portions 330 in a third position 500c.

FIG. 13A illustrates a perspective overview of an inner portions 330 in a first position 500*a*. FIG. 13B illustrates a perspective overview of an inner portions 330 in a second position 500*b*. FIG. 13C illustrates a perspective overview of an inner portions 330 in a third position 500*c*.

Figure 14A:
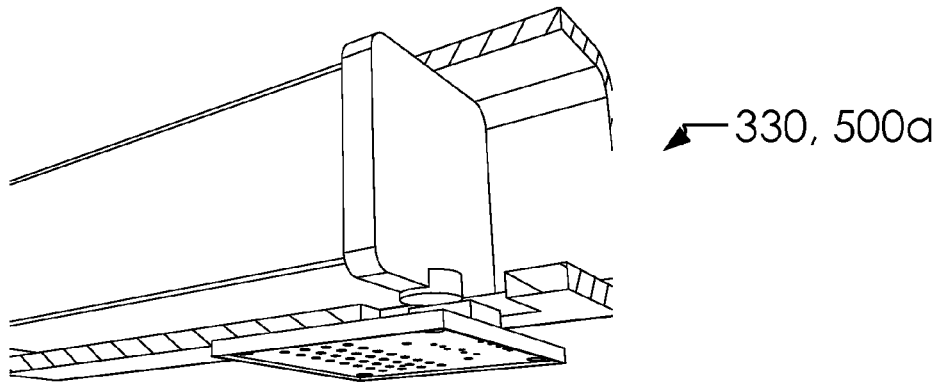
FIG. 14A illustrates a perspective overview of an inner portions 330 in a first position 500a with a cross-section view of said outer draw tube 302.
Figure 14B:
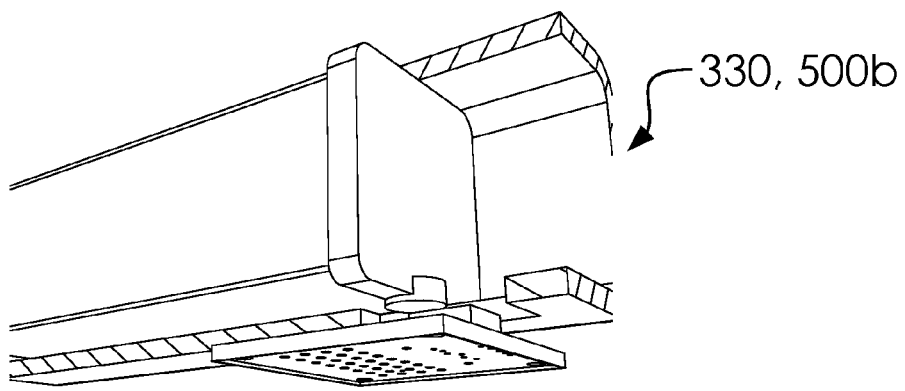
FIG. 14B illustrates a perspective overview of an inner portions 330 in a second position 500b with a cross-section view of said outer draw tube 302.
Figure 14C:
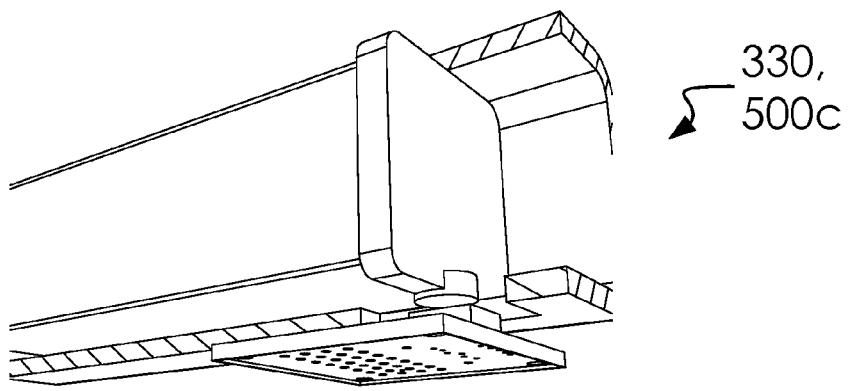
FIG. 14C illustrates a perspective overview of an inner portions 330 in a third position 500c with a cross-section view of said outer draw tube 302.

FIG. 14A illustrates a perspective overview of an inner portions 330 in a first position 500*a* with a cross-section view of said outer draw tube 302. FIG. 14B illustrates a perspective overview of an inner portions 330 in a second position 500*b* with a cross-section view of said outer draw tube 302. FIG. 14C illustrates a perspective overview of an inner portions 330 in a third position 500*c* with a cross-section view of said outer draw tube 302.

In one embodiment, said hitch system 100 can adjust for forces such as said forward force 506 and said rearward force 508 by buffering signals sent to said sensor and circuit assembly 1100 since proximity 606 is buffered by the elasticity of said first elastic energy storage device 304 and said second elastic energy storage device 306.

As noted in paragraph 0042 of the "Parent Application" (U.S. patent application Ser. No. 14/136,468), said hitch system 100 can comprise an integrated modular hitch. That is, for example, said hitch system 100 can be used as between a truck (or towing vehicle) and a trailer (or "trailer", "trailer vehicle"). In this arrangement, said integrated circuit 1204 can be arranged between said first harness plug 112*a* attached to said towing vehicle and said second harness plug 112*b* attached to said trailer. Therein, said integrated circuit 1204 (or "controller") can produce a result which can be applied to any receiver hitch simply by inserting the insert hitch into the receiver hitch of the truck and plugging said one or more harness plugs 112 ("the leads") from said integrated circuit 1204 ("the integrated controller") into the truck and plugging the trailer into the hitch. Accordingly, transportability of said hitch system 100 between various vehicles is achieved with ease.

As noted in the Parent Application and current specification, said hitch system 100 can attach between two vehicles. Namely, in one embodiment, said hitch ball 110 can selectively attach to said trailer (or trailer) and said draw tube assembly 104 can selectively attach to said tow vehicle (or truck). In one embodiment, said draw tube assembly 104 can slide inside of a trailer hitch receiver on said tow vehicle, as is known in the art. In one embodiment, said third keyed pin 118*c* can slide through said outer aperture 312 and said inner aperture 314, as illustrated. Thereby, said third keyed pin 118*c* can hold said inner draw tube 308 in a special relationship with tow vehicle. Thus, as discussed in U.S. patent application Ser. No 14/136,468 (having been incorporated by reference with this application), said inner draw tube 308 can comprise a "vehicle tow member" and said outer draw tube 302 can comprise a "trailer town member".

As supported in paragraphs 0018-0028 of the Parent Application and shown and described in FIGS. 5A-6C of the original current specification, in one embodiment, as said inner draw tube 308 moves forward along said x axis 422 relative to said outer draw tube 302, then it can be concluded that said hitch system 100 is decelerating. Conversely, if said inner draw tube 308 and said outer draw tube 302 move in an opposite direction, it can be concluded that said hitch system 100 is accelerating. Said proximity 606 (illustrated herein as said forward movement distance 502 and said rearward movement distance 504 in FIGS. 5A-5C) can be measured to determine physical characteristics of said hitch system 100, said tow vehicle and said trailer (trailer). In one embodiment, said movement between said outer draw tube 302 and said inner draw tube 308 can be measured with said sensor 1206 which can comprise a hall effect sensor (as disclosed in the original claims herewith and in the Parent Application at paragraphs at 0021, et. sec.). Portions of the Parent Application are quoted verbatim in the following paragraph.

In its simplest form, the sensor operates as an analog transducer, directly returning a voltage. With a known magnetic field, its distance from the Hall plate can be determined. Using groups of sensors, the relative position of the magnet can be deduced. Electricity carried through a conductor will produce a magnetic field that varies with current, and a Hall sensor can be used to measure the current without interrupting the circuit. Typically, the sensor is integrated with a wound core or permanent magnet that surrounds the conductor to be measured. Frequently, a Hall sensor is combined with circuitry that allows the device to act in a digital (on/off) mode, and may be called a switch in this configuration. Commonly seen in industrial applications, they are also used in consumer equipment. Hall sensors are commonly used to time the speed of wheels and shafts, such as for internal combustion engine ignition timing, tachometers and anti-lock braking systems. In one embodiment, said sensor (such as said sensor 1206) can output a voltage of 2.35v when there is no net magnetic field perpendicular to the face of the sensor. As the magnetic field increases in one direction, the voltage increases proportionally. As the magnetic field increases in the opposite direction, the voltage drops proportionally.

As noted in paragraph [0025] of the Parent Application, magnets (such as said magnet 604) can be mounted in said hitch system 100, the relative position of said sensor location 602 and said magnet 604 can be measured.

As noted in paragraph [0027] of the Parent Application, a micro controller (such as said integrated circuit 1204) can read the output of the Hall sensor, and can output to the brakes of the trailer a PWM (Pulse Width Modulated) signal proportional to the relative displacement. Mild braking of the pulling vehicle will produce a mild braking of the trailing vehicle. Aggressive braking of the pulling vehicle will produce aggressive braking of the trailing vehicle. And appropriate braking of the trailer will be produced regardless of the weight of the trailer, or its trailer.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein.

The invention claimed is:

1. A tow hitch that detects movement between a towing vehicle and a trailer having trailer brakes and adjusts braking forces of the trailer brakes proportionately to a displacement, the tow hitch comprising:

said tow hitch comprising a trailer tow member, a vehicle tow member, a one or more sensors, and a controller,
said trailer tow member is selectively engaged with said vehicle tow member;
said trailer tow member and said vehicle tow member substantially share an x axis;
said x axis substantially comprises a direction of travel of said tow hitch;
said one or more sensors comprising at least a first sensor;
said first sensor selectively measures a displacement of said trailer tow member relative to said vehicle tow member along said x axis;
said first sensor is configured to measure said displacement between the vehicle tow member and the trailer tow member when the trailer tow member is engaged with the vehicle tow member;
said first sensor is in electronic communication with the controller;
said displacement of said trailer tow member relative to said vehicle tow member is communicated to said controller;
said controller adjusts the braking forces of the trailer brakes proportionately to the displacement;
said vehicle tow member is arranged between a first elastic energy storage device and a second elastic energy storage device; and
said displacement of said vehicle tow member relative to said trailer tow member is defined as being
along said x axis and
between said first elastic energy storage device and said second elastic energy storage device.

2. The tow hitch of claim 1, wherein said first sensor is a pressure sensor.

3. The tow hitch of claim 1, wherein said first sensor is an optical sensor.

4. The tow hitch of claim 1, wherein said first sensor comprises a Hall sensor.

5. The tow hitch of claim 1, wherein said first sensor is a magnetic sensor.

6. The tow hitch of claim 1, wherein at least one of the one or more sensors comprises a strain gauge.

7. The tow hitch of claim 1, wherein the tow hitch comprises an integrated modular hitch being configured to selectively attach between a variety of tow vehicles and trailers.

8. The tow hitch of claim 1, further comprising draw tube assembly having an outer draw tube and an inner draw tube; wherein,
said trailer tow member comprises said outer draw tube,
said vehicle tow member comprises said inner draw tube, and
said inner draw tube selectively slides within said outer draw tube.

9. The tow hitch of claim 8 wherein,
said inner draw tube is arranged between the first elastic energy storage device and the second elastic energy storage device; and
said displacement of said inner draw tube relative to said outer draw tube is defined as being
along said x axis and
between said first elastic energy storage device and said second elastic energy storage device.

10. The tow hitch of claim 8 wherein,
said tow hitch comprises a one or more keyed pins;
a portion of said draw tube assembly is configured to selectively slide into a trailer hitch receiver of said tow vehicle;
said inner draw tube is configured to selectively attach to said trailer hitch receiver by
sliding a one of said one or more keyed pins through a portion of said outer draw tube and a portion of said inner draw tube; and
said one of said one or more keyed pins moves freely relative to said x axis of said outer draw tube but directly moves said inner draw tube relative to said x axis.

11. The tow hitch of claim 10, wherein
said outer draw tube comprises an outer aperture being wider than said one of said one or more keyed pins as measured along said x axis;
said inner draw tube comprises an inner aperture having an internal diameter being substantially equal an external diameter of said one of said one or more keyed pins; and
said one of said one or more keyed pins moves along said x axis relative to said outer draw tube but does not move relative to said inner draw tube.

12. The tow hitch of claim 1, wherein
said first elastic energy storage device and said second elastic energy storage device are configured to compress, decompress and return to a nominal shape as before, during and after said displacement of said vehicle tow member and said trailer tow member.

13. The tow hitch of claim 1, wherein
said tow hitch further comprises a ball foot assembly; and
said trailer tow member is configured to selectively attach to said trailer with said ball foot assembly.

14. The tow hitch of claim 1, wherein
said controller is in electronic communication with the trailer brakes, said one or more sensors, and one or more harness plugs;
said one or more harness plugs comprise
a first harness plug being configured to selectively attach to said tow vehicle and read a one or more signals from said tow vehicle, and
a second harness plug being configured to selectively attach to said trailer and read and send a one or more signal to and from said trailer;
said controller is configured to analyze said signals including
said displacement between said trailer tow member and said vehicle tow member, and
said braking signal on said one or more harness plugs; and
said controller is programmed to selectively engage said braking signal as sent to said trailer brakes on said trailer.

15. The tow hitch of claim 14, wherein
said tow hitch further comprises a circuit compartment being substantially sealed from environmental damage; and
said controller is substantially sealed within said circuit compartment.

16. The tow hitch of claim 8, wherein
said tow hitch further comprises a magnet;
said magnet is attached to a portion of said inner draw tube;
said one or more sensors are attached to a portion of said tow hitch and moves in relative space with said outer draw tube; and
said one or more sensors measure said displacement of said magnet.

17. The tow hitch of claim 16, wherein
said outer draw tube comprises a sensor notch configured to allow a portion of said magnet to pass freely past said one or more sensors; and
said magnet is attached to said inner draw tube so as to ensure said magnet is arranged within said sensor notch while assembled.

18. A tow hitch that detects movement between a towing vehicle and a trailer having trailer brakes and adjusts braking forces of the trailer brakes proportionately to a displacement, the tow hitch comprising:
said tow hitch comprising a trailer tow member, a vehicle tow member, a one or more sensors, and a controller,
said trailer tow member is selectively engaged with said vehicle tow member;
said trailer tow member and said vehicle tow member substantially share an x axis;
said x axis substantially comprises a direction of travel of said tow hitch;
said one or more sensors comprising at least a first sensor;
said first sensor selectively measures a displacement of said trailer tow member relative to said vehicle tow member along said x axis;
said first sensor is configured to measure said displacement between the vehicle tow member and the trailer tow member when the trailer tow member is engaged with the vehicle tow member;
said first sensor is in electronic communication with the controller;
said displacement of said trailer tow member relative to said vehicle tow member is communicated to said controller;
said controller adjusts the braking forces of the trailer brakes proportionately to the displacement;
said draw tube assembly having an outer draw tube and an inner draw tube; wherein,
said trailer tow member comprises said outer draw tube,
said vehicle tow member comprises said inner draw tube, and
said inner draw tube selectively slides within said outer draw tube;
said inner draw tube is arranged between a first elastic energy storage device and a second elastic energy storage device; and
said displacement of said inner draw tube relative to said outer draw tube is defined as being
along said x axis and
between said first elastic energy storage device and said second elastic energy storage device.

19. A tow hitch that detects movement between a towing vehicle and a trailer having trailer brakes and adjusts braking forces of the trailer brakes proportionately to a displacement, the tow hitch comprising:
said tow hitch comprising a trailer tow member, a vehicle tow member, a one or more sensors, and a controller,
said trailer tow member is selectively engaged with said vehicle tow member;
said trailer tow member and said vehicle tow member substantially share an x axis;
said x axis substantially comprises a direction of travel of said tow hitch;
said one or more sensors comprising at least a first sensor;
said first sensor selectively measures a displacement of said trailer tow member relative to said vehicle tow member along said x axis;
said first sensor is configured to measure said displacement between the vehicle tow member and the trailer tow member when the trailer tow member is engaged with the vehicle tow member;
said first sensor is in electronic communication with the controller;
said displacement of said trailer tow member relative to said vehicle tow member is communicated to said controller;
said controller adjusts the braking forces of the trailer brakes proportionately to the displacement;
said draw tube assembly having an outer draw tube and an inner draw tube; and wherein,
said trailer tow member comprises said outer draw tube,
said vehicle tow member comprises said inner draw tube, and
said inner draw tube selectively slides within said outer draw tube;
said tow hitch comprises a one or more keyed pins;
a portion of said draw tube assembly is configured to selectively slide into a trailer hitch receiver of said tow vehicle;
said inner draw tube is configured to selectively attach to said trailer hitch receiver by
sliding a one of said one or more keyed pins through a portion of said outer draw tube and a portion of said inner draw tube; and
said one of said one or more keyed pins moves freely relative to said x axis of said outer draw tube but directly moves said inner draw tube relative to said x axis.

20. A tow hitch that detects movement between a towing vehicle and a trailer having trailer brakes and adjusts braking forces of the trailer brakes proportionately to a displacement, the tow hitch comprising:
said tow hitch comprising a trailer tow member, a vehicle tow member, a one or more sensors, and a controller,
said trailer tow member is selectively engaged with said vehicle tow member;
said trailer tow member and said vehicle tow member substantially share an x axis;
said x axis substantially comprises a direction of travel of said tow hitch;
said one or more sensors comprising at least a first sensor;
said first sensor selectively measures a displacement of said trailer tow member relative to said vehicle tow member along said x axis;
said first sensor is configured to measure said displacement between the vehicle tow member and the trailer tow member when the trailer tow member is engaged with the vehicle tow member;
said first sensor is in electronic communication with the controller;
said displacement of said trailer tow member relative to said vehicle tow member is communicated to said controller;
said controller adjusts the braking forces of the trailer brakes proportionately to the displacement;
said draw tube assembly having an outer draw tube and an inner draw tube; and wherein,
said trailer tow member comprises said outer draw tube,
said vehicle tow member comprises said inner draw tube, and
said inner draw tube selectively slides within said outer draw tube;
said tow hitch further comprises a magnet;
said magnet is attached to a portion of said inner draw tube;

said one or more sensors are attached to a portion of said tow hitch and moves in relative space with said outer draw tube; and said one or more sensors measure said displacement of said magnet.

21. A tow hitch that detects movement between a towing vehicle and a trailer having trailer brakes and adjusts braking forces of the trailer brakes proportionately to a displacement, the tow hitch comprising:

said tow hitch comprising a trailer tow member, a vehicle tow member, a one or more sensors, and a controller, said trailer tow member is selectively engaged with said vehicle tow member;

said trailer tow member and said vehicle tow member substantially share an x axis;

said x axis substantially comprises a direction of travel of said tow hitch;

said one or more sensors comprising at least a first sensor;

said first sensor selectively measures a displacement of said trailer tow member relative to said vehicle tow member along said x axis;

said first sensor is configured to measure said displacement between the vehicle tow member and the trailer tow member when the trailer tow member is engaged with the vehicle tow member;

said first sensor is in electronic communication with the controller;

said displacement of said trailer tow member relative to said vehicle tow member is communicated to said controller;

said controller adjusts the braking forces of the trailer brakes proportionately to the displacement;

said controller is in electronic communication with the trailer brakes, said one or more sensors, and a one or more harness plugs;

said one or more harness plugs comprise
 a first harness plug being configured to selectively attach to said tow vehicle and read a one or more signals from said tow vehicle, and
 a second harness plug being configured to selectively attach to said trailer and read and send a one or more signal to and from said trailer;

said controller is configured to analyzes said signals including
 said displacement between said trailer tow member and said vehicle tow member, and
 said braking signal on said one or more harness plugs; and said controller is programmed to selectively engage said braking signal as sent to said trailer brakes on said trailer.

* * * * *